(12) United States Patent
Imamura et al.

(10) Patent No.: US 12,420,281 B2
(45) Date of Patent: Sep. 23, 2025

(54) MICROCHANNEL CHIP

(71) Applicant: SEKISUI CHEMICAL CO., LTD., Osaka (JP)

(72) Inventors: Kazuhiko Imamura, Osaka (JP); Nobuhiko Inui, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 868 days.

(21) Appl. No.: 17/641,220

(22) PCT Filed: Sep. 28, 2020

(86) PCT No.: PCT/JP2020/036569
§ 371 (c)(1),
(2) Date: Mar. 8, 2022

(87) PCT Pub. No.: WO2021/065777
PCT Pub. Date: Apr. 8, 2021

(65) Prior Publication Data
US 2023/0145735 A1 May 11, 2023

(30) Foreign Application Priority Data
Oct. 2, 2019 (JP) .................................. 2019-182331

(51) Int. Cl.
*B01L 3/00* (2006.01)
*B01F 25/422* (2022.01)
(Continued)

(52) U.S. Cl.
CPC ....... *B01L 3/50273* (2013.01); *B01J 19/0093* (2013.01); *B01L 2300/0816* (2013.01);
(Continued)

(58) Field of Classification Search
None
See application file for complete search history.

(56) References Cited

U.S. PATENT DOCUMENTS 6,321,791 B1 * 11/2001 Chow ............... B01L 3/502707
137/833
2002/0097633 A1 * 7/2002 O'Connor .......... B01D 17/0208
366/341
(Continued)

FOREIGN PATENT DOCUMENTS

JP 2007-519917 7/2007
JP 2009-229240 10/2009
(Continued)

OTHER PUBLICATIONS

International Search Report issued Dec. 8, 2020 in International (PCT) Application No. PCT/JP2020/036569.

*Primary Examiner* — Neil N Turk
(74) *Attorney, Agent, or Firm* — Wenderoth, Lind & Ponack, L.L.P.

(57) ABSTRACT

A microchannel chip (1) includes: a first channel (201); a reagent holder (230); a gas inlet (210) communicating with the first channel; a lid (50) closing the gas inlet; and a second channel (202) provided downstream of the first channel. A specimen holder (240) is provided downstream of the reagent holder (230). When the lid (50) closes the gas inlet (210), gas is supplied to the first channel (201) and pushes out the reagent downstream from the reagent holder (230). Thus, the pushed-out reagent merges with a specimen in the second channel (202).

9 Claims, 7 Drawing Sheets

(51) Int. Cl.
 *B01F 33/30* (2022.01)
 *B01J 19/00* (2006.01)
(52) U.S. Cl.
 CPC ............. *B01L 2300/0867* (2013.01); *B01L 2300/0887* (2013.01)

(56) References Cited

U.S. PATENT DOCUMENTS

| | | | |
|---|---|---|---|
| 2006/0034727 | A1 | 2/2006 | Takamura et al. |
| 2006/0193751 | A1* | 8/2006 | Jung ............... B01L 3/508 436/514 |
| 2007/0048192 | A1 | 3/2007 | Kartalov et al. |
| 2008/0227185 | A1 | 9/2008 | Schonfeld et al. |
| 2012/0270225 | A1* | 10/2012 | Wakeley ........... C12Q 1/6834 435/6.12 |
| 2013/0302842 | A1* | 11/2013 | Berthier ............ A01N 1/146 435/29 |

FOREIGN PATENT DOCUMENTS

| | | |
|---|---|---|
| JP | 2010-133843 | 6/2010 |
| JP | 2012-132879 | 7/2012 |
| JP | 2019-70615 | 5/2019 |
| WO | 2011/065176 | 6/2011 |
| WO | 2013/046417 | 4/2013 |

* cited by examiner

MICROCHANNEL CHIP

TECHNICAL FIELD

The present invention relates to a microchannel chip.

BACKGROUND ART

There are many attempts to perform various tests such as a blood test and a genetic test as well as biochemical analysis using a chip having microchannels so as to control supply and/or reactions of various kinds of specimens and samples. Such a microchannel chip for tests or analyses includes a channel structure capable of merging and mixing a plurality of kinds of fluid with each other.

Especially in the fields such as the medical field and the biochemical field, there is a demand for downsizing and simplifying analytical equipment. Also, analyzing a trace specimen is required in consideration of high-speed analysis and reduction of burden on a human body. Thus, microchannel chips are also required to contribute to size reduction and simplified structure, and to perform stable analysis of a trace specimen.

The conventional microchannel chips take time to supply and react a specimen after introduction, which occasionally causes drying or coagulation of the specimen. Therefore, it is difficult to accurately react or measure the specimen. Taking into account the above, a microchannel chip is proposed, for example in Patent Document 1, to which a supply tank for anticoagulant, a pump and the like are attached. With this configuration, the anticoagulant, which causes anticoagulation reaction of blood, is supplied to the channel.

PRIOR ART DOCUMENT

Patent Document

[Patent Document 1] WO 2011/065176

SUMMARY OF THE INVENTION

Problem to be Solved by the Invention

However, providing a supply tank for a compound or an antibody to serve as anticoagulant causing the anticoagulation reaction on the microchannel chip, as disclosed in Patent Document 1, increases costs. Moreover, it is not preferable from the viewpoint of size reduction and simplification of the device. In addition to the above, sometimes it is necessary for a human body to make directly contact with the microchannel chip when introducing a specimen, which may result in health damage caused by the compound or the antibody erroneously touched by the human body.

The present invention was made in consideration of the above problems, an object of which is to provide a microchannel chip with a simple structure, which is capable of supplying liquid or causing reaction rapidly without using any compound or antibody causing the anticoagulation reaction of the blood.

Means for Solving the Problem

In order to achieve the above object, a microchannel chip of the present invention, which is a microchannel chip that mixes first liquid and second liquid to supply the thus mixed liquid, includes: a first channel; a first liquid holder provided on the first channel to store the first liquid; a gas inlet that communicates with the first channel and is opened to the outside of a system on the upstream side of the first liquid holder; a lid closing the gas inlet; a second channel provided downstream of the first channel; and a second liquid holder to hold the second liquid, which is capable of communicating with the downstream side of the first liquid holder. The downstream side of the second channel is opened to the outside of the system. When the lid is closed, gas is supplied to the first channel and pushes out the first liquid downstream from the first liquid holder, and the thus pushed-out first liquid merges with the second liquid in the second channel.

The microchannel chip as described above preferably includes: a first base plate, in a first surface of which the first channel is formed; and a second base plate laminated on and bonded to the first base plate so as to face the first surface. It is also preferable that the gas inlet is provided in the first base plate so as to open to a second surface on an opposite side of the first surface, and that the lid is to be attached facing to the second surface.

In the microchannel chip as described above, the second channel may be formed in the first base plate, and the second channel may be connected to the first channel downstream of the first liquid holder.

In the microchannel chip as described above, it is preferable that the second liquid holder is provided on the second channel. Also, it is preferable that the second liquid holder includes an opening part provided in the second surface so as to introduce the second liquid, and furthermore that the lid includes a first closing part that closes the gas inlet and a second closing part that closes the opening part.

The microchannel chip as described above may have a configuration in which the lid includes a third channel capable of being connected to the first channel, so that when the lid is closed, the first channel is connected to the second channel provided in the first base plate via the third channel.

The microchannel chip as described above may have a configuration in which the second liquid holder is provided on the second channel, and an opening part to introduce the second liquid is formed in the second surface. Also, it is preferable that the second liquid holder is provided so as to protrude from the second surface.

In the microchannel chip as described above, it is preferable that the second liquid holder is provided on the third channel, and that an opening part to introduce the second liquid is formed in the lid so as to open to a surface facing the second surface. Also, the second liquid holder may be formed in a downstream end of the third channel, and may be connected to the second channel when the lid is closed.

The microchannel chip as described above may have a configuration in which the lid includes a fourth channel whose upstream end is opened to the outside of the system and whose downstream end is capable of being connected to the second channel, so that when the lid is closed, the upstream end of the fourth channel is closed while the downstream end of the fourth channel is connected to the second channel.

The microchannel chip as described above may have a configuration in which the second liquid holder is provided in the downstream end of the fourth channel, and an opening part to introduce the second liquid is formed in the lid so as to open to a surface facing the second surface. In this way, when the lid is closed, gas is supplied to the fourth channel and pushes out the second liquid downstream from the second liquid holder, and that the thus pushed-out second liquid merges with the first liquid in the second channel.

The microchannel chip as described above may have a configuration in which the second liquid holder is provided so as to protrude from a surface of the lid, which faces the second surface.

Effects of the Invention

With the present invention, a microchannel chip with a simple structure is provided, which is capable of supplying liquid or causing reaction rapidly.

MODE FOR CARRYING OUT THE INVENTION

Hereinafter, a microchannel chip 1 according to the embodiments of the present invention will be described with reference to the drawings.

Embodiment 1

Figure 1A:
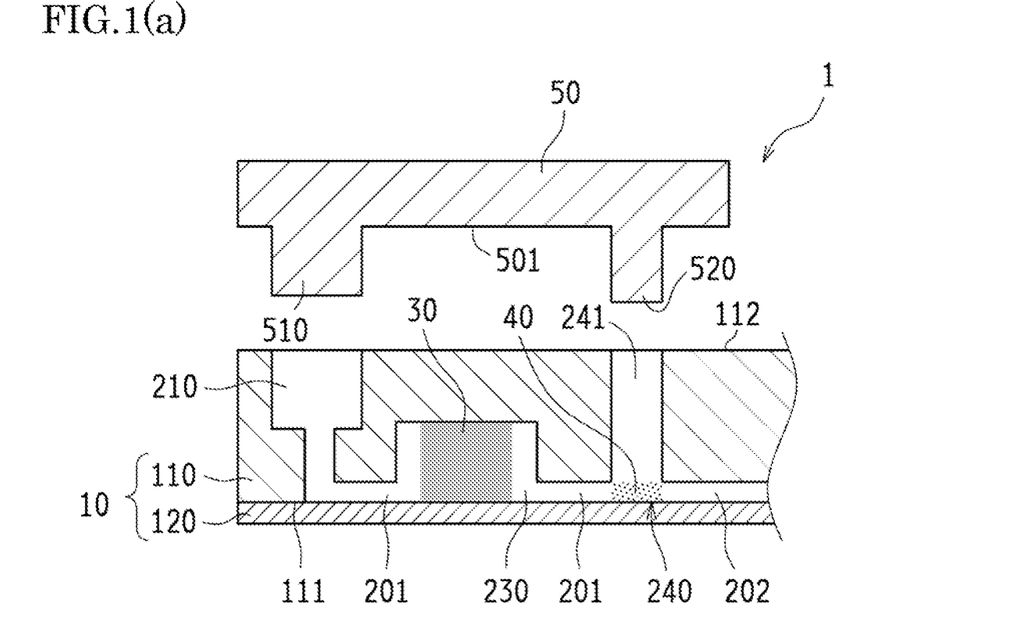
FIG. 1(a) and FIG. 1(b) are partial sectional views schematically illustrating a microchannel chip according to Embodiment 1 of the present invention.
Figure 1B:
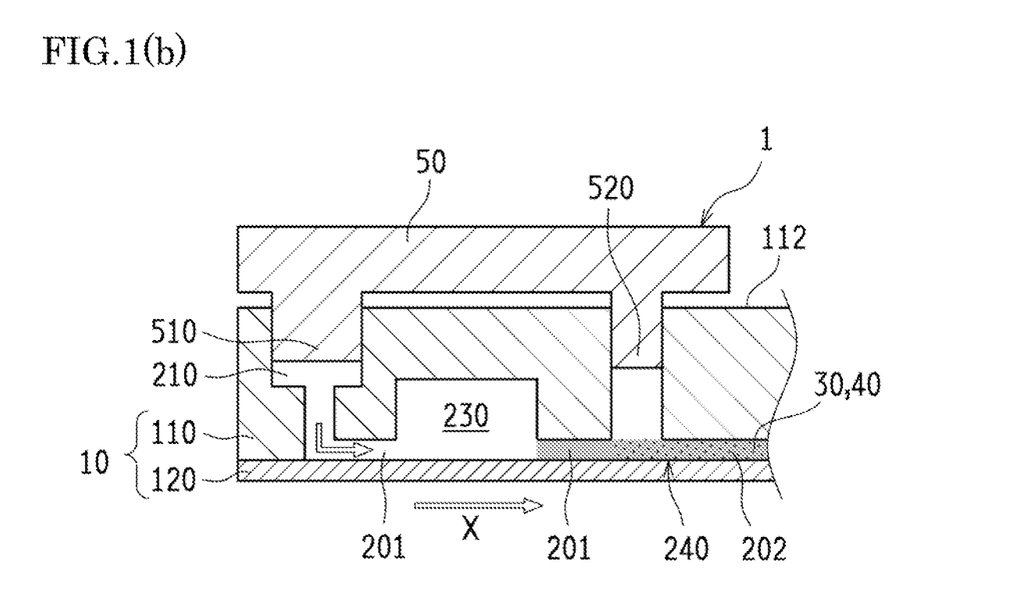
Figure 2:
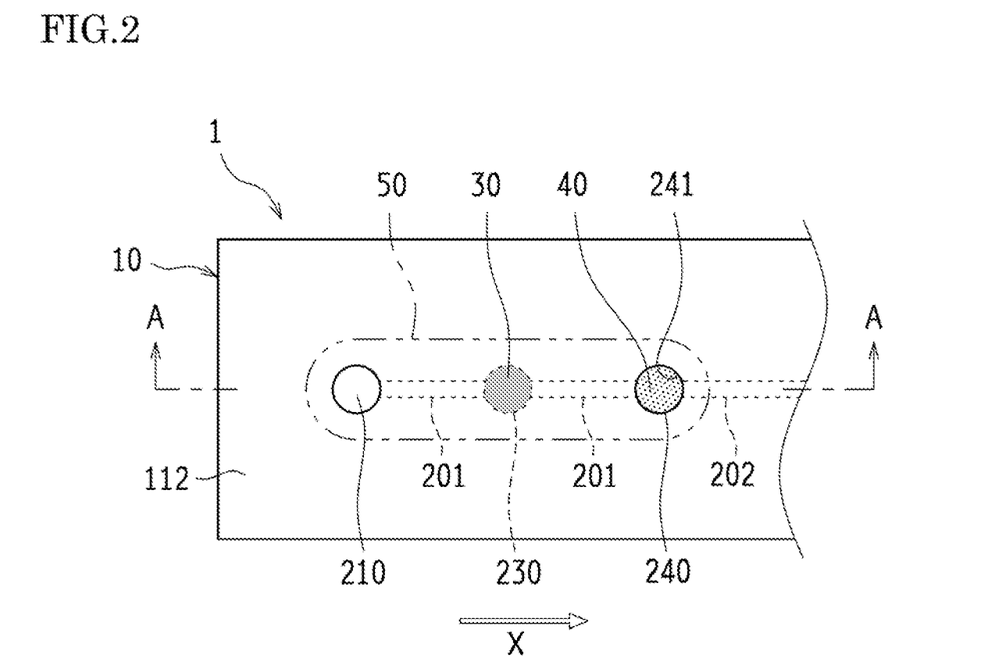
FIG. 2 is a front view illustrating a chip body of the microchannel chip.

FIG. 1(a) and FIG. 1(b) are partial sectional views schematically illustrating a main part of a microchannel chip 1 according to Embodiment 1 of the present invention. FIG. 2 is a front view illustrating a chip body 10 of the microchannel chip 1. FIG. 1(a) and FIG. 1(b) correspond to cross-sectional views taken along the line A-A of FIG. 2.

The microchannel chip 1 is a chip for testing or analyzing. The microchannel chip 1 includes fine channels for, for example, mixing a reagent 30 as a first liquid and a specimen 40 as a second liquid and supplying the mixture to be subjected to a desired treatment step. As shown in FIG. 2, the microchannel chip 1 has a rectangular-plate shape. However, the general shape of the microchannel chip 1 is not limited to the rectangular-plate shape. It may have any shape, for example, a disk shape or a sector shape.

As shown in FIG. 1(a), the microchannel chip 1 is provided with the chip body 10 and a lid 50 to be attached to the chip body 10. The chip body 10 includes a first base plate 110 and a second base plate 120. The first base plate 110 is a plate-like member having a lower surface (first surface) 111 and an upper surface (second surface) 112 on the opposite side of the lower surface 111. The second base plate 120 is also a plate-like member that is laminated on and bonded to the lower surface 111 of the first base plate 110. The first base plate 110 and the second base plate 120 each may be formed by an injection molded body made of synthetic resin, or also may be formed by laminating a plurality of synthetic resin sheets.

In the following description, the lid 50 is provided on the upper side of the chip body 10 of the microchannel chip 1 while the second base plate 120 is bonded to the bottom surface of the first base plate 110, as shown in FIG. 1(a) and FIG. 1(b). However, this definition of the vertical direction is only for understandability of the description, and thus does not limit the direction when using the microchannel chip 1 according to this embodiment.

In the microchannel chip 1 according to Embodiment 1, the chip body 10 includes a first channel 201 and a second channel 202. The first channel 201 is disposed upstream of the second channel 202 (i.e. on the left side in FIG. 1(a) and FIG. 1(b)). The first channel 201 and the second channel 202 are provided in this order in the liquid feeding direction X so as to communicate with each other. In these schematically shown drawings, the channels 201 and 202 have a linear shape. However, the channels 201 and 202 may have any shape.

On the upstream side of the first channel 201, a gas inlet 210 is provided so as to open to the outside of the system. In the embodiment exemplarily shown, the gas inlet 210 is provided so as to open to the upper surface 112 of the first base plate 110.

On the first channel 201, a reagent holder (first liquid holder) 230 is provided so as to store the reagent 30. On the upstream side of the reagent holder 230, the gas inlet 210 is provided. Thus, the reagent holder 230 and the gas inlet 210 communicate with each other via the first channel 201.

Since the reagent holder 230 has a constriction structure, the reagent 30 can be stably stored therein. When comparing the cross-sectional areas of the respective cross sections orthogonally intersecting with the liquid feeding direction X, the cross-sectional area of the first channel 201 downstream of the reagent holder 230 is, for example, smaller than the cross-sectional area of the reagent holder 230. In this way, the channel resistance at the time of movement of the reagent 30 downstream in the reagent holder 230 increases, which contributes to stable storing of the reagent 30 in the reagent holder 230.

On the second channel 202 downstream of the first channel 201, a specimen holder (second liquid holder) 240 is provided so as to store the specimen 40. The specimen holder 240 is provided downstream of the reagent holder 230, and also is connected to the first channel 201 provided on the downstream side of the reagent holder 230. The second channel 202 is opened to the outside of the system on the downstream side of the specimen holder 240.

In the microchannel chip 1 according to Embodiment 1, the specimen holder 240 is disposed in the chip body 10, and an opening part 241 is formed in the upper surface 112 of the first base plate 110 so as to introduce the specimen 40. The opening part 241 communicates with the specimen holder 240 on the second channel 202. The specimen 40 is introduced into the specimen holder 240 using a syringe or a pipette via the opening part 241.

The upper surface 112 and the lower surface 111 of the first base plate 110 of the chip body 10 are parallel to each other. Respective recesses to be the first channel 201 and the second channel 202 are formed in the lower surface 111 of the first base plate 110. Thus, when the second base plate 120 is laminated on the first base plate 110, the first channel 201 and the second channel 202 are formed as spaces sandwiched between the first base plate 110 and the second base plate 120.

The microchannel chip 1 is provided with the first channel 201 and the second channel 202 as the fine channels generating micro effects when feeding the liquid. It is preferable, for example, that these channels respectively have a cross-sectional size (i.e. width, height or inner diameter) of the cross-section orthogonally intersecting with the liquid feeding direction X in the range of 0.01 to 10 mm, from the viewpoint of reduction in the channel resistance. The channels may have any cross-sectional shape, for example, a rectangle shape and a circle shape.

The lid 50 is attached to the upper surface 112 of the first base plate 110 of the chip body 10. As shown in FIG. 1(a), the lid 50 includes a first closing part 510 that closes the gas inlet 210 and a second closing part 520 that closes the opening part 241. The lid 50 is made of, for example, elastomer or synthetic resin that has elasticity or adherence.

The first closing part 510 and the second closing part 520 are provided, in a protruding manner, on a lower surface 501 of the lid 50. The lower surface 501 faces the upper surface 112 of the first base plate 110. The first closing part 510 has a protruded shape corresponding to the gas inlet 210 so as to be fitted in the gas inlet 210. The second closing part 520 has a protruded shape corresponding to the opening part 241 so as to be fitted in the opening part 241.

As shown in FIG. 1(b), the lid 50 is attached to the chip body 10 so that the gas inlet 210 and the opening part 241 are closed. Thus, the first closing part 510 closes the gas inlet 210 while the second closing part 520 closes the opening part 241, so that the liquid is started to be supplied.

When the lid 50 is attached to the chip body 10, the first closing part 510 is press-fitted in the gas inlet 210 so as to close the gas inlet 210. Since the internal space of the gas inlet 210 is narrowed, the gas (air) in the gas inlet 210 flows into the first channel 201. The gas supplied to the first channel 201 pushes out the reagent 30 downstream from the reagent holder 230. The pushed-out reagent 30 flows from the first channel 201 to the second channel 202.

Also, the second closing part 520 is press-fitted in the opening part 241 so as to close the opening part 241. Thus, the specimen stored in the specimen holder 240 is pushed out from the specimen holder 240 to flow through the second channel 202. In the second channel 202, the reagent 30 from the reagent holder 230 merges with the specimen 40.

More specifically, the specimen 40 pushed out from the specimen holder 240 wets and spreads over the inner wall of the second channel 202. Thus, the wet and spread specimen 40 remains in the second channel 202 while forming a space where the gas can pass through. Therefore, the reagent 30 that has flowed in the liquid feeding direction X merges with the specimen 40 that has wetted and spread on the second channel 202, so that mixed liquid is prepared. By making the inner wall of the second channel 202 of material having a high affinity for the specimen 40, the specimen 40 effectively wets and spreads, which results in reliable merge of the reagent 30 with the specimen 40.

In the microchannel chip 1 as described above according to this embodiment, by attaching the lid 50 to the chip body 10 after introducing the specimen 40 into the specimen holder 240, the reagent 30 is immediately mixed with the specimen 40 so as to be held as the mixed liquid. Therefore, it is possible to prevent drying and coagulation of the specimen 40 without using any compound or antibody to serve as anticoagulant causing the anticoagulation reaction, which contributes to accurate reaction and measurement of the specimen 40. Also, since it is not required to use the compound or the antibody, which results in no supply tank being needed, it is possible to reduce production costs and to form the microchannel chip 1 with a simple configuration.

Embodiment 2

Figure 3A:
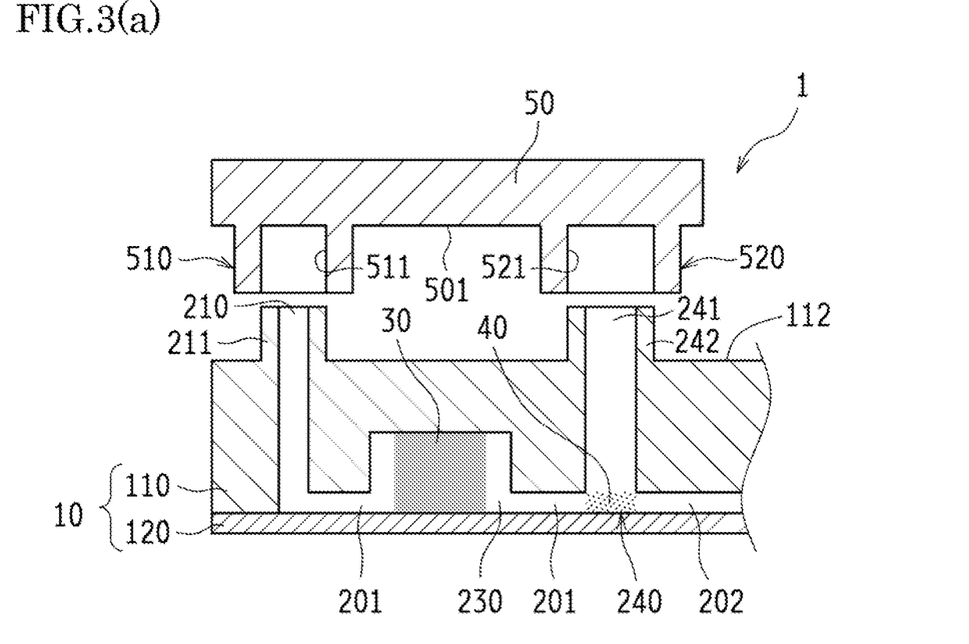
FIG. 3(a) and FIG. 3(b) are partial sectional views schematically illustrating a microchannel chip according to Embodiment 2 of the present invention.
Figure 3B:
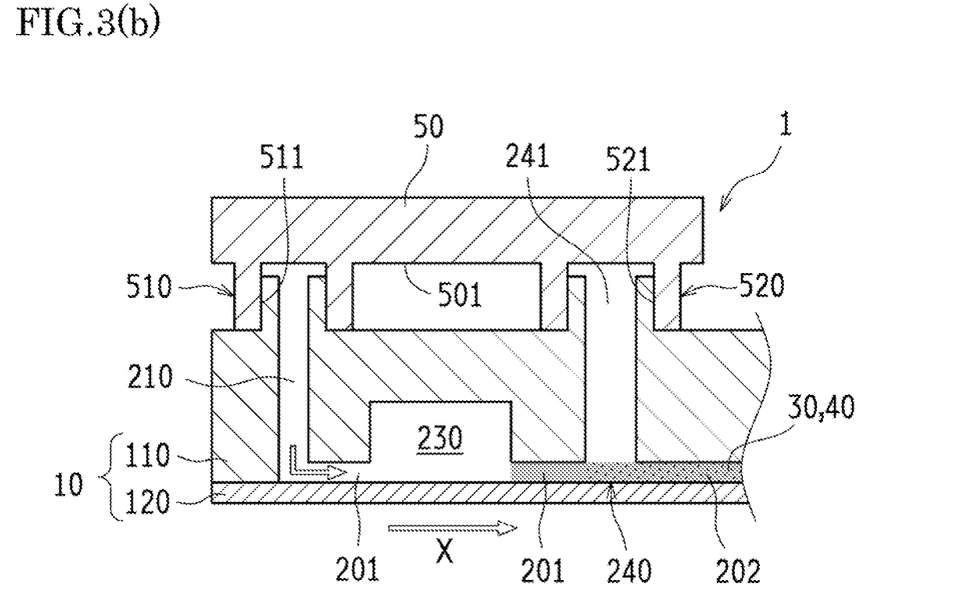

FIG. 3(a) and FIG. 3(b) are partial sectional views schematically illustrating a main part of the microchannel chip 1 according to Embodiment 2. FIG. 3(a) and FIG. 3(b) correspond to cross-sectional views taken along the line A-A of FIG. 2.

Since the general configuration of the microchannel chip 1 according to Embodiments 2 to 6 described below is substantially the same as that in Embodiment 1, the common configuration is indicated by the same reference numerals as those in Embodiment 1, and the repetitive description thereof is omitted.

In the microchannel chip 1 according to Embodiment 1, the first closing part 510 of the lid 50 is fitted in the gas inlet 210 while the second closing part 520 of the lid 50 is fitted in the opening part 241. In contrast to the above, in the microchannel chip 1 according to Embodiment 2, the gas inlet 210 is fitted in the lid 50.

As shown in FIG. 3(a), a protruding gas inlet 211 is provided, in a protruding manner, on the upper surface 112 of the first base plate 110. The gas inlet 210 as an opening is formed in the protruding gas inlet 211. Also, a specimen introducing protruding part 242 is provided, in a protruding manner, on the upper surface 112 of the first base plate 110. The opening part 241 is provided in the specimen introducing protruding part 242 so as to communicate with the specimen holder 240. A certain amount of specimen 40 is introduced into the specimen holder 240 using a pipette or the like via the opening part 241 of the specimen introducing protruding part 242.

On the other hand, a recess part 511 corresponding to the protruding gas inlet 211 is provided in the first closing part 510 of the lid 50 while a recess part 521 corresponding to the specimen introducing protruding part 242 is provided in the second closing part 520 of the lid 50.

As shown in FIG. 3(b), when the lid 50 is attached to the chip body 10, the protruding gas inlet 211 is fitted in the first closing part 510 so that the gas inlet 210 is closed. Also, the specimen introducing protruding part 242 is fitted in the second closing part 520 so that the opening part 241 is closed.

In this way, the gas is supplied from the gas inlet 210 to the first channel 201, and the gas supplied to the first channel 201 pushes out the reagent 30 downstream from the reagent holder 230. The pushed-out reagent 30 merges with the specimen 40 in the second channel 202.

Therefore, in the microchannel chip 1 according to this embodiment also, by attaching the lid 50 to the chip body 10 after introducing the specimen 40 into the specimen holder 240, the reagent 30 is immediately mixed with the specimen 40 so as to be held as the mixed liquid, similarly to Embodiment 1.

Embodiment 3

Figure 4A:
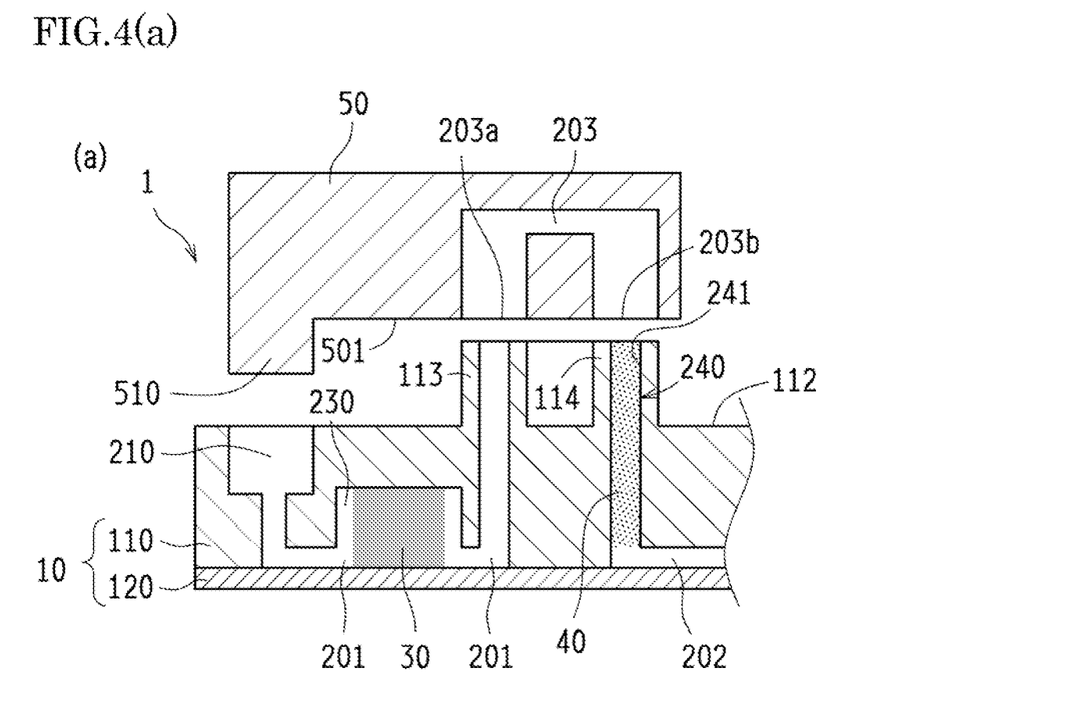
FIG. 4(a) and FIG. 4(b) are partial sectional views schematically illustrating a microchannel chip according to Embodiment 3 of the present invention.
Figure 4B:
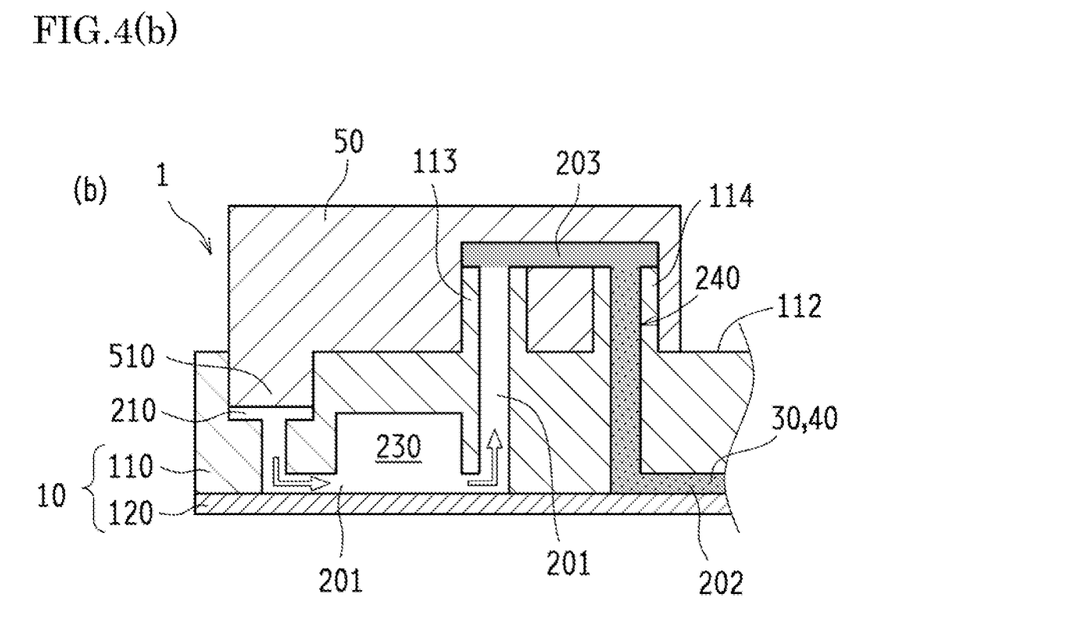

FIG. 4(a) and FIG. 4(b) are partial sectional views schematically illustrating a main part of the microchannel chip 1 according to Embodiment 3. FIG. 4(a) and FIG. 4(b) correspond to cross-sectional views taken along the line A-A of FIG. 2.

In the microchannel chip 1 according to Embodiment 1, the first channel 201 of the chip body 10 is directly connected to the second channel 202. In contrast to the above, in the microchannel chip 1 according to Embodiment 3, the first channel 201 of the chip body 10 is connected to the second channel 202 of the chip body 10 via a third channel 203 provided in the lid 50.

As shown in FIG. 4(*a*), the lid 50 is provided with the third channel 203 to be connected to the first channel 201. The third channel 203 is a channel passing through the inside of the lid 50. The third channel 203 includes an upstream end opening 203*a* and a downstream end opening 203*b*, both of which are opened to the outside of the system.

Similarly to Embodiment 1, the chip body 10 includes: the gas inlet 210; the first channel 201 communicating with the gas inlet 210; and the reagent holder 230 on the first channel 201. The first channel 201 extending downstream of the reagent holder 230 has a downstream end that is opened to the upper surface 112 of the first base plate 110. In this case, the first channel 201 downstream of the reagent holder 230 extends from the lower surface 111 of the first base plate 110 to the upper surface 112 side thereof, and the downstream end is opened to the upper surface 112 of the first base plate 110.

A first protruding part 113 and a second protruding part 114 are provided on the upper surface 112 of the first base plate 110 in a protruding manner. These first protruding part 113 and the second protruding part 114 are formed so as to respectively correspond to the upstream end opening 203*a* and the downstream end opening 203*b* of the lid 50. The first channel 201 is vertically provided inside of the first protruding part 113, and the downstream end of the first channel 201 is opened to the upper end of the first protruding part 113. The specimen holder 240 is provided inside of the second protruding part 114 so as to communicate with the second channel 202. The opening part 241 of the specimen holder 240 is opened to the upper end of the second protruding part 114.

Since the specimen holder 240 is protruded from the upper surface 112 of the first base plate 110, the specimen 40 can be directly collected without using the pipette or the like. That is to say, the opening part 241 formed in the second protruding part 114 can be used as a specimen collecting port. In this case, when the opening part 241 is come into contact with the specimen 40, the specimen 40 is introduced into the specimen holder 240 by capillary force till the specimen holder 240 is filled up with the specimen 40. The specimen holder 240 is a channel having a circular cross-section. Thus, the specimen 40 can be drawn by the capillary force.

In order to use the capillary force as drive force to directly collect the specimen 40 in the specimen holder 240, it is preferable, for example, that the opening part 241 is formed to have an inner diameter in the range of not less than 0.1 mm to not more than 2.0 mm. It is more preferable that the opening part 241 has an inner diameter in the range of not less than 0.4 mm to not more than 1.2 mm. In this way, it is possible to easily collect the specimen 40 such as blood from a finger or the like of a human body by the capillary force.

As shown in FIG. 4(*b*), when the lid 50 is attached to the chip body 10, the gas inlet 210 is closed by the first closing part 510 while the first protruding part 113 and the second protruding part 114 are covered with the lid 50. In other words, the first protruding part 113 of the chip body 10 is fitted in the upstream end opening 203*a* of the third channel 203 of the lid 50, and the second protruding part 114 is fitted in the downstream end opening 203*b* of the third channel 203 of the lid 50. Thus, the first channel 201 is connected to the second channel 202 provided in the first base plate 110 via the third channel 203.

The gas supplied from the gas inlet 210 to the first channel 201 pushes out the reagent 30 downstream from the reagent holder 230 so as to feed the reagent 30 downstream of the first channel 201. The reagent 30 passes through the first channel 201 and the third channel 203 of the lid 50, and reaches the specimen holder 240. The specimen 40 in the specimen holder 240 wets and spreads on the second channel 202, and then the reagent 30 merges with the specimen 40 to be mixed with the specimen 40.

Therefore, in the microchannel chip 1 according to this embodiment also, by attaching the lid 50 to the chip body 10 after introducing the specimen 40 into the specimen holder 240, the reagent 30 is immediately mixed with the specimen 40 so as to be held as the mixed liquid. Also, since the specimen 40 can be directly collected in the specimen holder 240, it does not take time to introduce the specimen 40 into the specimen holder 240, which contributes to easy collection of the specimen 40.

Embodiment 4

Figure 5A:
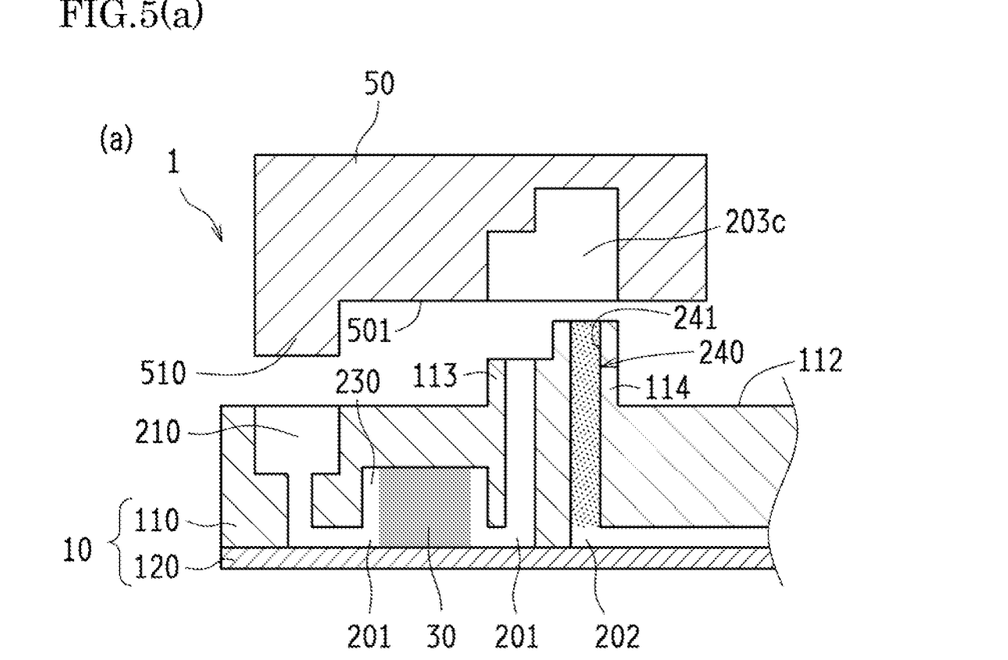
FIG. 5(a) and FIG. 5(b) are partial sectional views schematically illustrating a microchannel chip according to Embodiment 4 of the present invention.
Figure 5B:
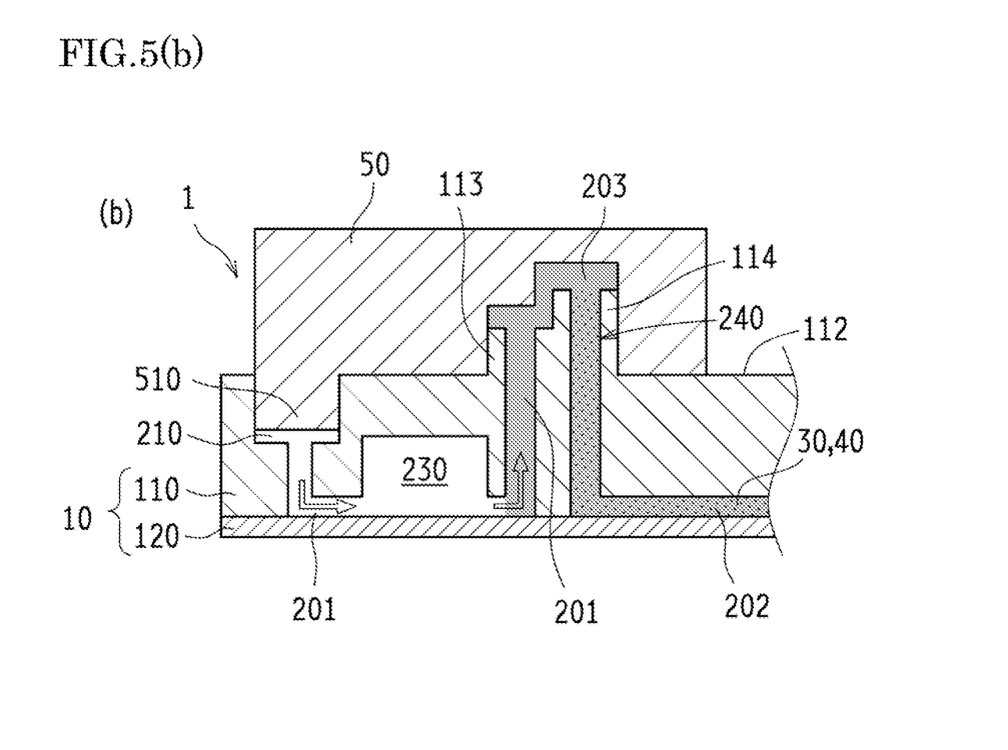

FIG. 5(*a*) and FIG. 5(*b*) are partial sectional views schematically illustrating a main part of the microchannel chip 1 according to Embodiment 4. FIG. 5(*a*) and FIG. 5(*b*) correspond to cross-sectional views taken along the line A-A of FIG. 2.

In the microchannel chip 1 according to Embodiment 3, the third channel 203 passes through the inside of the lid 50. In contrast to the above, in the microchannel chip 1 according to Embodiment 4, the third channel 203 is formed between the chip body 10 and the lid 50 when the lid 50 is attached to the chip body 10.

As shown in FIG. 5(*a*), a channel forming recess part 203*c* for forming the third channel 203 is formed in the lid 50 as a recess part having an opening to the lower surface 501. Also, the first protruding part 113 and the second protruding part 114 are formed on the chip body 10 as an integrally protruding part having a shape corresponding to the channel forming recess part 203*c*.

The upper end of the second protruding part 114 is protruded upward further than the upper end of the first protruding part 113. The specimen holder 240 is provided inside of the second protruding part 114 so as to communicate with the second channel 202. The opening part 241 of the specimen holder 240 is opened to the upper end of the second protruding part 114. Thus, when the opening part 241 formed in the second protruding part 114 is come into contact with the specimen 40, the specimen 40 can be introduced into the specimen holder 240 by the capillary force.

As shown in FIG. 5(*b*), when the lid 50 is attached to the chip body 10, the gas inlet 210 is closed by the first closing part 510 while the first protruding part 113 and the second protruding part 114 are covered with the lid 50. In other words, the first protruding part 113 and the second protruding part 114 of the chip body 10 are both fitted in the channel forming recess part 203*c* of the lid 50. The channel forming recess part 203*c* is designed such that neither the upper end of the first protruding part 113 nor the upper end of the second protruding part 114 reaches the inner surface of the channel forming recess part 203*c* when the lid 50 is attached to the chip body 10. Thus, the third channel 203 is formed in the gap between the inner surface of the channel forming recess part 203*c*, and the first protruding part 113 and the second protruding part 114. The first channel 201 is connected to the second channel 202 provided in the first base plate 110 via the third channel 203 formed between the chip body 10 and the lid 50 by the channel forming recess part 203c.

The gas supplied from the gas inlet 210 to the first channel 201 pushes out the reagent 30 downstream from the reagent holder 230 so as to feed the reagent 30 downstream of the first channel 201. The reagent 30 passes through the first channel 201 and the third channel 203 of the lid 50, and reaches the specimen holder 240. The specimen 40 in the specimen holder 240 wets and spreads on the second channel 202, and then the reagent 30 merges with the specimen 40 to be mixed with the specimen 40.

Therefore, in the microchannel chip 1 according to this embodiment also, by attaching the lid 50 to the chip body 10 after introducing the specimen 40 into the specimen holder 240, the reagent 30 is immediately mixed with the specimen 40 so as to be held as the mixed liquid. Also, since the specimen 40 can be directly collected in the specimen holder 240, it does not take time to introduce the specimen 40 into the specimen holder 240, which contributes to easy collection of the specimen 40.

Also, in order to form the third channel 203, the channel forming recess part 203c is provided in the lid 50, and the channel forming recess part 203c is a recess part having the opening to the lower surface 501 of the lid 50. Thus, the channel forming recess part 203c can be provided as a simple configuration, which contributes to easy molding.

Embodiment 5

Figure 6A:
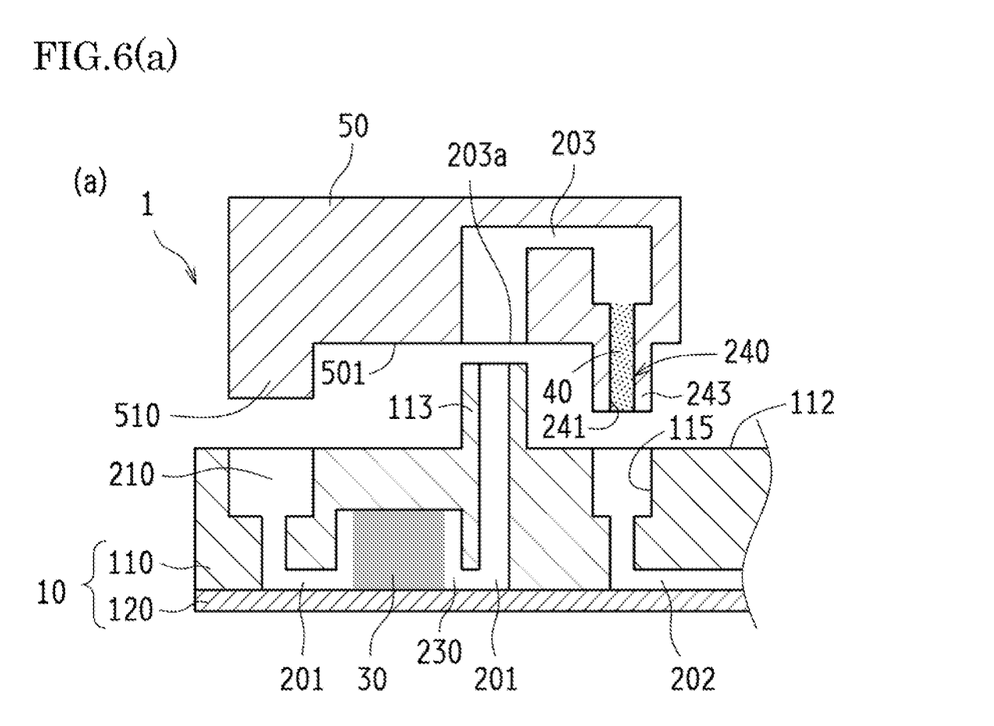
FIG. 6(a) and FIG. 6(b) are partial sectional views schematically illustrating a microchannel chip according to Embodiment 5 of the present invention.
Figure 6B:
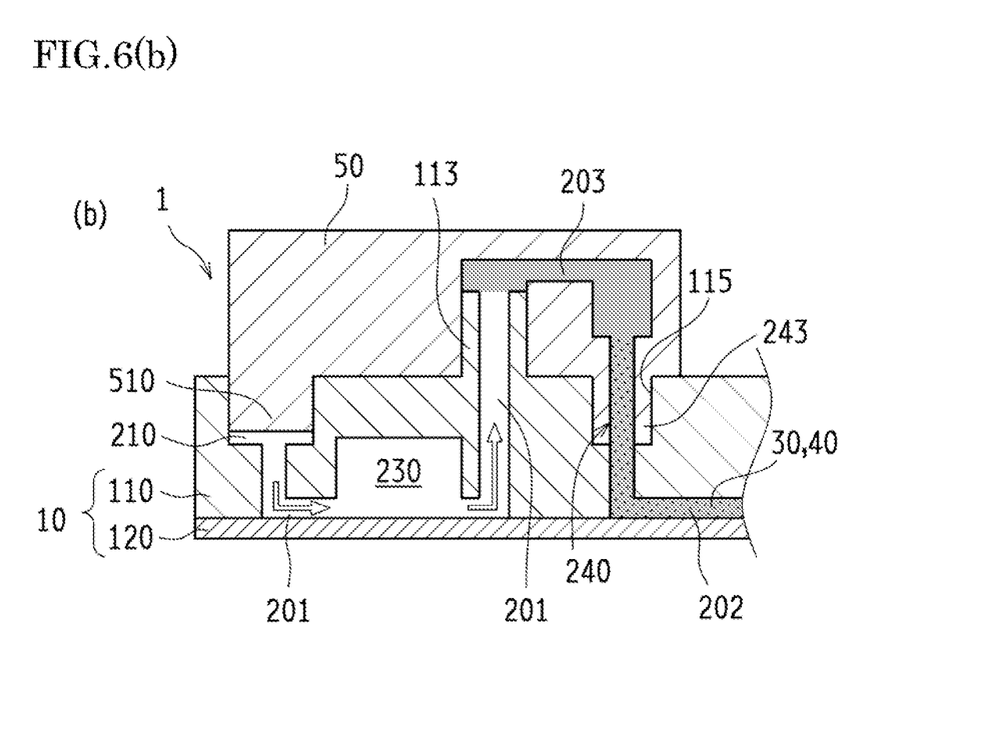

FIG. 6(a) and FIG. 6(b) are partial sectional views schematically illustrating a main part of the microchannel chip 1 according to Embodiment 5. FIG. 6(a) and FIG. 6(b) correspond to cross-sectional views taken along the line A-A of FIG. 2.

In the microchannel chip 1 according to Embodiments 1 to 4, the specimen holder 240 is provided in the chip body 10. In contrast to the above, in the microchannel chip 1 according to Embodiment 5, the specimen holder 240 is provided in the lid 50.

As shown in FIG. 6(a), the lid 50 is provided with the third channel 203 to be connected to the first channel 201. The third channel 203 is a channel passing through the inside of the lid 50. The third channel 203 includes: the upstream end opening 203a formed in the upstream end thereof so as to open to the outside of the system; and the specimen holder 240 formed in the downstream end thereof.

In the case exemplarily shown, the lid 50 is provided with a third protruding part 243 that is protruded from the lower surface 501. The specimen holder 240 is provided in the third protruding part 243 so as to communicate with the third channel 203. The opening part 241 for introducing the specimen 40 into the specimen holder 240 is provided in the lower end of the third protruding part 243 so as to open to the lower surface 501 of the lid 50. Thus, the specimen holder 240 is provided, in a protruding manner, on the lower surface 501 of the lid 50.

The first channel 201 provided in the chip body 10 extends, on the downstream side of the reagent holder 230, from the lower surface 111 of the first base plate 110 to the upper surface 112 side thereof, and the downstream end is opened to the upper surface 112 of the first base plate 110. The first protruding part 113 is provided on the upper surface 112 of the first base plate 110 in a protruding manner. The downstream end of the first channel 201 is opened to the upper end of the first protruding part 113. The first protruding part 113 is formed so as to correspond to the upstream end opening 203a of the lid 50. A joining recess part 115, which has the opening to the upper surface 112, is provided in the chip body 10 so as to correspond to the third protruding part 243.

As shown in FIG. 6(b), when the lid 50 is attached to the chip body 10, the gas inlet 210 is closed by the first closing part 510. Also, the first protruding part 113 is fitted in the upstream end opening 203a of the lid 50 while the third protruding part 243 of the lid 50 is fitted in the joining recess part 115 of the chip body 10. The third channel 203 and the first protruding part 113 are formed such that the upper end of the first protruding part 113 does not reach the inner surface of the third channel 203 when the lid 50 is attached to the chip body 10.

In this way, the first channel 201 is connected to the second channel 202 provided in the first base plate 110 via the third channel 203 formed in the lid 50 and the specimen holder 240 of the lid 50. Since the specimen holder 240 is provided in the downstream end of the third channel 203, it is connected to the second channel 202 when the lid 50 is hermetically attached.

The gas supplied from the gas inlet 210 to the first channel 201 pushes out the reagent 30 downstream from the reagent holder 230 so as to feed the reagent 30 downstream of the first channel 201. The reagent 30 passes through the first channel 201 and the third channel 203 of the lid 50, and reaches the specimen holder 240. The specimen 40 in the specimen holder 240 flows from the lid 50 to the chip body 10, and wets and spreads on the second channel 202. Then, the reagent 30 merges with the specimen 40 to be mixed with the specimen 40.

Thus, in the microchannel chip 1 according to this embodiment also, by attaching the lid 50 to the chip body 10 after introducing the specimen 40 into the specimen holder 240, the reagent 30 is immediately mixed with the specimen 40 so as to be held as the mixed liquid. Also, in addition to direct collection of the specimen 40 in the specimen holder 240, since the specimen holder 240 is provided on the lid 50 in a protruding manner, it is possible to further easily collect the specimen 40.

Embodiment 6

Figure 7A:
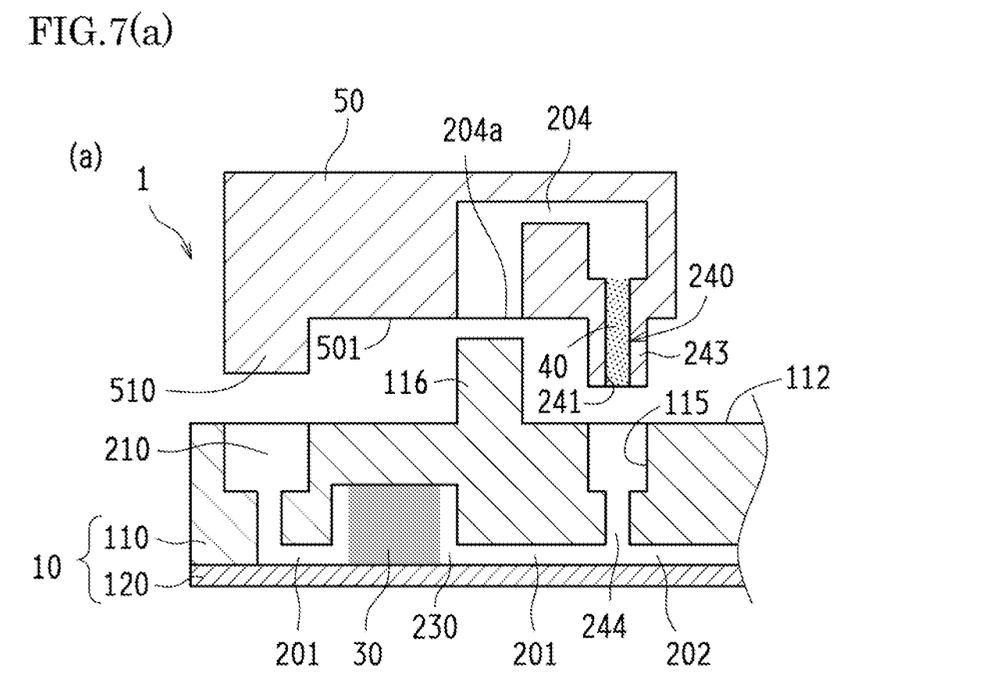
FIG. 7(a) and FIG. 7(b) are partial sectional views schematically illustrating a microchannel chip according to Embodiment 6 of the present invention.
Figure 7B:
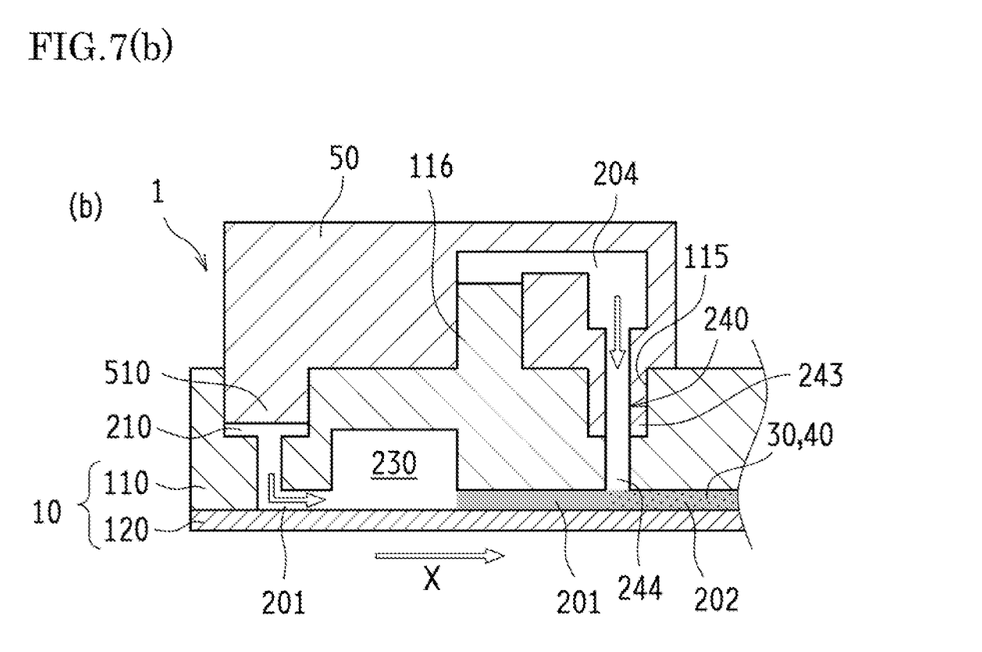

FIG. 7(a) and FIG. 7(b) are partial sectional views schematically illustrating a main part of the microchannel chip 1 according to Embodiment 6. FIG. 7(a) and FIG. 7(b) correspond to cross-sectional views taken along the line A-A of FIG. 2.

In the microchannel chip 1 according to Embodiment 5, the third channel 203 to be connected to the first channel 201 is provided in the lid 50. In contrast to the above, in the microchannel chip 1 according to Embodiment 6, a fourth channel 204 to be connected to the second channel 202 is provided in the lid 50.

As shown in FIG. 7(a), the lid 50 is provided with the fourth channel 204 whose upstream end is opened to the outside of the system and whose downstream end is to be connected to the second channel 202 of the chip body 10. The fourth channel 204 is a channel passing through the inside of the lid 50. The fourth channel 204 includes: an upstream end opening 203a formed in the upstream end thereof so as to open to the outside of the system; and the specimen holder 240 formed in the downstream end thereof.

In the case exemplarily shown, the lid 50 is provided with a third protruding part 243 that is protruded from the lower surface 501. The specimen holder 240 is provided in the third protruding part 243 so as to communicate with the fourth channel 204. The opening part 241 for introducing the specimen 40 is provided in the third protruding part 243. Thus, the opening part 241 is protruded on the lower surface 501 of the lid 50 and opened to the lower surface 501 of the lid 50.

The first channel 201 provided in the chip body 10 extends, on the downstream side of the reagent holder 230, in the liquid feeding direction X along the lower surface 111 of the first base plate 110. The first channel 201 is directly connected to the second channel 202.

The joining recess part 115 and a connecting channel 244 communicating with the joining recess part 115 are connected to the second channel 202. The joining recess part 115 corresponding to the third protruding part 243 is opened to the upper surface 112 of the first base plate 110. The connecting channel 244 is disposed between the joining recess part 115 and the second channel 202.

The first base plate 110 is provided with a third closing part 116 provided on the upper surface 112 in a protruding manner. The third closing part 116 is protruded to correspond to the upstream end opening 203a of the fourth channel 204 of the lid 50, and is fitted in the upstream end opening 203a.

As shown in FIG. 7(b), when the lid 50 is attached to the chip body 10, the gas inlet 210 is closed by the first closing part 510. Also, the third closing part 116 is fitted in the upstream end opening 203a of the fourth channel 204 of the lid 50 so as to close the upstream end opening 203a.

The third protruding part 243 of the lid 50 is fitted in the joining recess part 115 of the chip body 10. Accordingly, the fourth channel 204 and the specimen holder 240 of the lid 50 are connected to the connecting channel 244 of the chip body 10, and furthermore connected to the second channel 202.

When the lid 50 is closed, the gas is supplied to the fourth channel 204. Since the specimen holder 240 is provided in the downstream end of the fourth channel 204, the specimen 40 is pushed out from the specimen holder 240 by the supplied gas. The pushed-out specimen 40 flows from the lid 50 through the connecting channel 244 of the chip body 10 to the second channel 202, and thus wets and spreads on the second channel 202. Meanwhile, the gas supplied from the gas inlet 210 to the first channel 201 pushes out the reagent 30 downstream from the reagent holder 230 so as to feed the reagent 30 to the second channel 202 via the first channel 201. In the second channel 202, the reagent 30 merges with the specimen 40.

Thus, in the microchannel chip 1 according to this embodiment also, by attaching the lid 50 to the chip body 10 after introducing the specimen 40 into the specimen holder 240, the reagent 30 is immediately mixed with the specimen 40 so as to be held as the mixed liquid. Also, in addition to direct collection of the specimen 40 in the specimen holder 240, since the specimen holder 240 is provided on the lid 50 in a protruding manner, it is possible to further easily collect the specimen 40.

Therefore, it is possible to prevent drying and coagulation of the specimen 40 without providing any supply tank for the compound or antibody to serve as anticoagulant causing the anticoagulation reaction, which contributes to accurate reaction and measurement of the specimen 40. Also, the structure of the lid 50 of the microchannel chip 1 according to Embodiment 6 can be the same as that of the lid 50 in Embodiment 5.

In the microchannel chip 1 as described above, it is possible to immediately merge the reagent 30 with the specimen 40 so as to hold the mixed liquid without using any compound or antibody to serve as anticoagulant causing the anticoagulation reaction. Thus, it is possible to reduce production costs as well as burden on a human body, which results in the microchannel chip 1 capable of supplying liquid rapidly with a simple structure. Accordingly, the size of the microchannel chip 1 can be further reduced. Furthermore, since the specimen holder 240 is provided in a protruding manner on the chip body 10 or the lid 50, it is possible to easily introduce the specimen 40 without taking time.

The configuration of the microchannel chip of the present invention is not limited to the configurations as described in the above embodiments, but may be implemented according to various other embodiments. As to the liquid to be mixed and supplied, it is not needed to be the reagent 30 as a first liquid, and also it is not needed to be the specimen 40 as a second liquid. Any kinds of liquid can be the object liquid of the present invention.

Although it is not shown in the drawings, a micro pump may be provided upstream of the second channel 202 in the above-described embodiments. In this case, by driving the micro pump after mixing of the reagent 30 with the specimen 40, the mixed liquid can be supplied further downstream. The kind of the micro pump is not particularly limited. For example, a light gas generating tape can be used, which generates gas by light emission.

The present invention may be embodied in other forms without departing from the gist or essential characteristics thereof. The foregoing embodiments are therefore to be considered in all respects as illustrative and not limiting. The scope of the invention is indicated by the appended claims rather than by the foregoing description, and all modifications and changes that come within the meaning and range of equivalency of the claims are intended to be embraced therein. This application claims priority based on Japanese Patent Application No. 2019-182331. The entire contents thereof are hereby incorporated in this application by reference.

DESCRIPTION OF THE REFERENCE NUMERALS

1 Microchannel chip
10 Chip body
110 First base plate
111 Lower surface (first surface)
112 Upper surface (second surface)
113 First protruding part
114 Second protruding part
120 Second base plate
201 First channel
202 Second channel
203 Third channel
204 Fourth channel
210 Gas inlet
230 Reagent holder (first liquid holder)
240 Specimen holder (second liquid holder)
241 Opening part
30 Reagent (first liquid)
40 Specimen (second liquid)
50 Lid
501 Lower surface
510 First closing part
520 Second closing part

The invention claimed is:

1. A microchannel chip for mixing a first liquid and a second liquid to supply a mixed liquid, the microchannel chip comprising:
   a first base plate;
   a first channel having an inlet and an outlet, the first channel being formed in a first surface of the first base plate;
   a second base plate laminated on and bonded to the first base plate so as to face the first surface;
   a first liquid holder formed in the first surface of the first base plate with the first channel and having a larger cross-sectional area than the first channel when orthogonally intersecting with a liquid feeding direction, the first liquid holder to store the first liquid and being capable of communicating with the first channel;
   a gas inlet communicating with the inlet of the first channel and being opened to an outside of the microchannel chip, the gas inlet being provided in the first base plate so as to open to a second surface on an opposite side of the first surface;
   a lid closing the gas inlet, the lid to be attached facing to the second surface;
   a second channel having an inlet and an outlet; and
   a second liquid holder capable of communicating with the first liquid holder, the second liquid holder to hold the second liquid, wherein
   the lid includes a third channel capable of being connected to the first channel,
   the outlet of the second channel is opened to the outside of the microchannel chip, and
   when the lid is closed, the outlet of the first channel is connected to the inlet of the second channel provided in the first base plate via the third channel, gas is supplied to the inlet of the first channel and pushes out the first liquid from the first liquid holder toward the outlet of the first channel, and the pushed-out first liquid merges with the second liquid from the second liquid holder in the second channel.

2. The microchannel chip according to claim 1, wherein the second liquid holder is provided on the second channel, and an opening part to introduce the second liquid is formed in the second surface.

3. The microchannel chip according to claim 1, wherein the second liquid holder is provided so as to protrude from the second surface.

4. The microchannel chip according to claim 1, wherein the second liquid holder is provided on the third channel, and an opening part to introduce the second liquid is formed in the lid so as to open to a surface facing the second surface.

5. The microchannel chip according to claim 4, wherein the second liquid holder is formed in an outlet end of the third channel, and is connected to the inlet of the second channel when the lid is closed.

6. A microchannel chip for mixing a first liquid and a second liquid to supply a mixed liquid, the microchannel chip comprising:
   a first base plate;
   a first channel having an inlet and an outlet, the first channel being formed in a first surface of the first base plate;
   a second base plate laminated on and bonded to the first base plate so as to face the first surface;
   a first liquid holder formed in the first surface of the first base plate with the first channel and having a larger cross-sectional area than the first channel when orthogonally intersecting with a liquid feeding direction, the first liquid holder to store the first liquid and being capable of communicating with the first channel;
   a gas inlet communicating with the inlet of the first channel and being opened to an outside of the microchannel chip, the gas inlet being provided in the first base plate so as to open to a second surface on an opposite side of the first surface;
   a lid closing the gas inlet, the lid to be attached facing to the second surface;
   a second channel having an inlet and an outlet; and
   a second liquid holder capable of communicating with the first liquid holder, the second liquid holder to hold the second liquid, wherein
   the outlet of the second channel is opened to the outside of the system microchannel chip,
   the lid includes a fourth channel having an inlet and an outlet, the inlet of the fourth channel being opened to the outside of the microchannel chip and the outlet of the fourth channel being capable of being connected to the inlet of the second channel, and
   when the lid is closed, the inlet of the fourth channel is closed while the outlet of the fourth channel is connected to the inlet of the second channel, gas is supplied to the inlet of the first channel and pushes out the first liquid from the first liquid holder toward the outlet of the first channel, and the pushed-out first liquid merges with the second liquid from the second liquid holder in the second channel.

7. The microchannel chip according to claim 6, wherein the second liquid holder is provided in an outlet end of the fourth channel, and an opening part to introduce the second liquid is formed in the lid so as to open to a surface facing the second surface, and
   when the lid is closed, gas is supplied to the inlet of the fourth channel and pushes out the second liquid from the second liquid holder, and the pushed-out second liquid merges with the first liquid in the second channel.

8. The microchannel chip according to claim 4, wherein the second liquid holder is provided so as to protrude from a surface of the lid, the surface facing the second surface.

9. The microchannel chip according to claim 6, wherein the second liquid holder is provided so as to protrude from a surface of the lid, the surface facing the second surface.

* * * * *